United States Patent [19]
Ichihara

[11] Patent Number: 5,884,587
[45] Date of Patent: Mar. 23, 1999

[54] CAR ENGINE COOLANT PIPELINE

[75] Inventor: Makoto Ichihara, Shizuoka-ken, Japan

[73] Assignee: Suzuki Motor Corporation, Shizuoka-Ken, Japan

[21] Appl. No.: 12,760

[22] Filed: Jan. 23, 1998

[30] Foreign Application Priority Data

Jan. 31, 1997 [JP] Japan .................................. 9-032878

[51] Int. Cl.$^6$ .................................................. F01P 9/00
[52] U.S. Cl. .................................. 123/41.01; 123/41.29; 237/12.3 B
[58] Field of Search ............................ 123/41.01, 41.29, 123/41.1; 237/12.3 B

[56] References Cited

U.S. PATENT DOCUMENTS 5,337,704   8/1994   Roth ..................................... 123/41.29

FOREIGN PATENT DOCUMENTS 106919   4/1989   Japan .................................. 123/41.01

Primary Examiner—Noah P. Kamen
Attorney, Agent, or Firm—Flynn, Thiel, Boutell & Tanis, P.C.

[57] ABSTRACT

A vehicle engine cooling pipeline arrangement has a water pipe with a radiator pipe section and a heater pipe section to which a radiator outlet hose and a heater outlet hose are respectively connected, and a pump pipe section which integrates the radiator and heater pipe sections and is connected to the water pump. The heater pipe section is provided under the exhaust manifold. The pipeline allows improved warming of the engine and can be used with various transmission types.

7 Claims, 3 Drawing Sheets

CAR ENGINE COOLANT PIPELINE

FIELD OF THE INVENTION

The present invention relates to a car engine coolant arrangement for a vehicle engine and, more specifically, to a coolant pipeline arrangement that is capable of improving the performance of a vehicle passenger compartment heater, improving the cooling capacity of the engine when it is heated, integrating the pipelines for a water pump regardless of the type of transmission, being designed with a thermo-case of a simple form, being realized at a low cost, and operating stably when cooling the vehicle engine.

BACKGROUND OF THE INVENTION

An engine as mounted in a vehicle is cooled by air or water to maintain an appropriate operation temperature. In the water-cooling method, the engine is cooled by circulating a coolant using a water pump and a thermostat between the water jacket of the engine and the radiator.

FIG. 7 shows a conventional vehicle engine coolant pipeline using the water-cooling method. In FIG. 7, 102 is a vehicle engine, and 104 is a water jacket associated with the engine. The engine 102 includes a radiator 106 for cooling the hot coolant received from the water jacket 104; a water pump 108 for circulating the coolant at a high pressure; a thermostat 110 for admitting or stopping the circulation of the coolant to the radiator 106 depending on the temperature of the coolant; and a heater core 112 for heating a passenger compartment (not shown in FIG. 7) of the vehicle.

The radiator 106 and thermostat 110 are connected to each other through a radiator inlet hose 114 and a radiator outlet hose 116. The water pump 108 and the thermostat 110 are connected to each other through a water pipe 118. A heater inlet hose 120 connects the thermostat 110 and the heater core 112 to each other. A heater outlet hose 122 connects core 112 and the water pipe 118 to each other.

When the temperature of the coolant is equal to or lower than a preset temperature, the thermostat 110 closes and stops the circulation of the coolant in the radiator 106. The coolant flows from the water jacket 104 to the heater inlet hose 120, the heater core 112, and the heater outlet hose 122, and then through the water pipe 118 to the water pump 108 and back into the water jacket 104. On the other hand, when the coolant temperature is higher than the preset temperature, the thermostat 110 opens to admit the circulation of the coolant into the radiator 106. The coolant flows from the water jacket 104 to the radiator inlet hose 114, the radiator 106, the radiator outlet hose 116, the water pipe 118, the water pump 108 and back into the water jacket 104. At the same time, the coolant also circulates through the heater core 112 as described above.

FIG. 8 shows another conventional vehicle engine coolant pipeline, wherein 202 is a vehicle engine, 204 is a water jacket. The vehicle engine 202 includes a radiator 206 for cooling the coolant of the water jacket 204; a water pump 208 for circulating the coolant at a high pressure; a thermostat 210 for admitting or stopping the circulation of the coolant to the radiator 206 depending on the temperature of the coolant; and a heater core 212 for heating a passenger compartment (not shown in FIG. 8) of the vehicle.

A radiator inlet hose 214 connects the radiator 206 and thermostat 210 to each other. A radiator outlet hose 216, a water pipe 217, and a water hose 218 connect the radiator 206 and the water pump 208 to each other. The water hose 218 is connected to the water pump 208. A heater inlet hose 220 connects the thermostat 210 and a heater core 212 to each other. A heater outlet hose 222 connects the heater core 212 and the water pipe 217 to each other.

When the temperature of the coolant is equal to or lower than a preset temperature, the thermostat 210 closes and stops the circulation of the coolant to the radiator 206. Then the coolant flows from the water jacket 204 to the heater inlet hose 220, the heater core 212, the heater outlet hose 222, the water pipe 217, and the water hose 218 to the water pump 208 and back into the water jacket 204. On the other hand, when the temperature of the coolant is higher than the preset temperature, the thermostat 210 opens to admit the circulation of the coolant to the radiator 206. Then the coolant flows from the water jacket 204 to the radiator inlet hose 214, the radiator 206, the radiator outlet hose 216, the water pipe 217, the water hose 218, the water pump 208, and back into the water jacket 204. At the same time, the coolant also circulates through the heater core 212 as described above.

In the arrangement of FIG. 7, since the water pipe 118 connecting the water pump 108 to the thermostat 110 is provided under an exhaust manifold 124 of the engine, the exhaust heat heats the coolant pipeline. This may cause a problem when the vehicle engine is operating in a warm or heated condition. Furthermore, since the thermostat 110 is connected to the radiator inlet hose 114, the radiator outlet hose 116, and the water pipe 118 in the coolant pipeline shown in FIG. 7, the structure of a thermo-case 126 is complicated.

As to the arrangement of FIG. 8, since the radiator 206 is connected to the water pump 208 through the radiator outlet hose 216, water pipe 217, and water hose 218, the coolant pipeline is a long pipe of several parts. Furthermore, since the coolant pipeline shown in FIG. 8 normally has the water pipe 217 fixed to the vehicle transmission (not shown in FIG. 8), and since different types of transmissions are connected to the engine 202, this may require using different shapes of water pipes, thereby increasing the cost of the cooling system.

SUMMARY OF THE INVENTION

To alleviate the above-described problems, the present invention includes a radiator for cooling the coolant of a vehicle engine; a water pump for circulating the coolant at a high pressure; a thermostat for admitting or stopping circulation of the coolant to the radiator depending on a temperature of the coolant; a radiator inlet hose for leading the coolant, which has passed through the thermostat, to the radiator; a radiator outlet hose for leading the coolant, which has passed through the radiator, to the water pump; a heater inlet hose for leading the coolant, which has not yet passed through the thermostat, to a heater core; a heater outlet hose for leading the coolant, which has passed through the heater core, to the water pump; and a water pipe having a radiator pipe unit and a pipe heater unit to which the radiator outlet hose and the heater outlet hose are connected respectively, and a pipe pump unit for combining the radiator and heater pipe units for connection to the water pump. With the above-described configuration, the heater pipe unit is positioned to pass under an exhaust manifold of the engine.

Furthermore, a body outlet hose for leading the coolant, which has passed through a throttle body, to the water pump is connected to the heater pipe unit which passes under the exhaust manifold.

In the present invention, the coolant pipeline arrangement includes a water pipe having a radiator pipe section and a heater pipe section to which the radiator outlet hose and the heater outlet hose are connected respectively, and also having a pipe pump section for combining the radiator and heater pipe sections for connection to the water pump. The heater pipe section is positioned to pass under an exhaust manifold. As a result, when the thermostat stops the circulation of coolant to the radiator, the coolant is warmed not only in the water jacket of the vehicle engine, but also by the exhaust heat from an exhaust manifold when the coolant is circulated from the heater core to the heater pipe section. In contrast, when the coolant is circulated to the radiator through the thermostat, the main flow of the coolant from the radiator is not circulated to the heater pipe section of the water pipe, and is not affected by the exhaust heat from the exhaust manifold.

Since the heater pipe section of the water pipe is provided under the exhaust manifold, water pipes of the same shape can be mounted on the engine regardless of the model of transmission mounted thereon. Therefore, only a radiator inlet hose is connected to the thermostat, without a radiator outlet hose or a water pipe being connected to the thermo-case, and the structure of a thermo-case for the thermostat is simplified.

Additionally, since a body outlet hose for introducing the coolant, which has passed through the throttle body, to a water pump is connected to the heater pipe section of the water pipe as provided under the exhaust manifold, the coolant warmed by the engine and the exhaust heat can be circulated in the throttle body if the coolant is not circulated to the radiator.

DETAILED DESCRIPTION

The embodiments of the present invention are described below by referring to the attached drawings. FIGS. 1 through 6 show the embodiment of the present invention.

Figure 1:
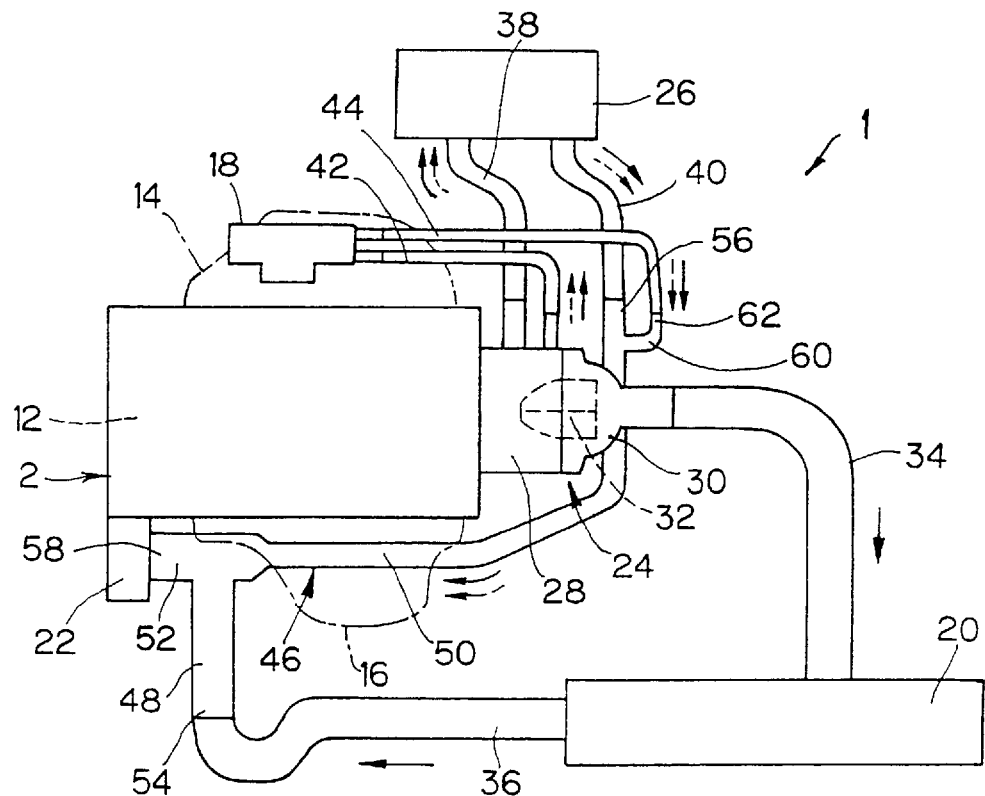
FIG. 1 is a diagrammatic top view of the coolant pipeline arrangement for a vehicle engine according to an embodiment of the present invention.
Figure 2:
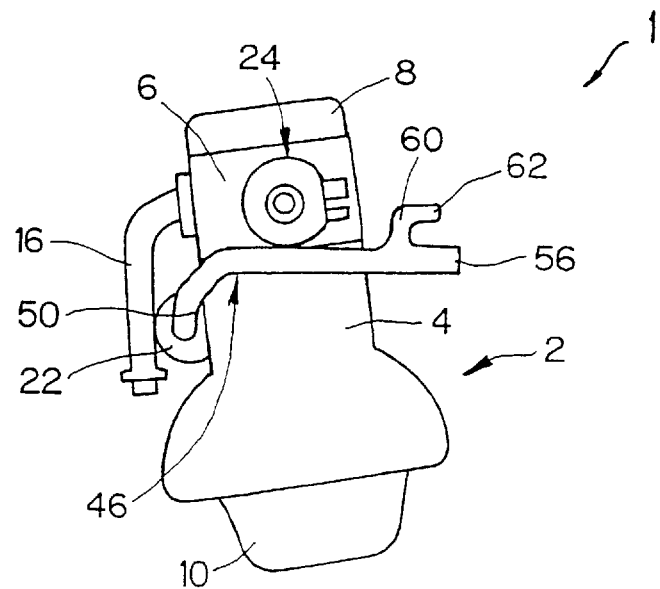
FIG. 2 is a side view of FIG. 1.
Figure 3:
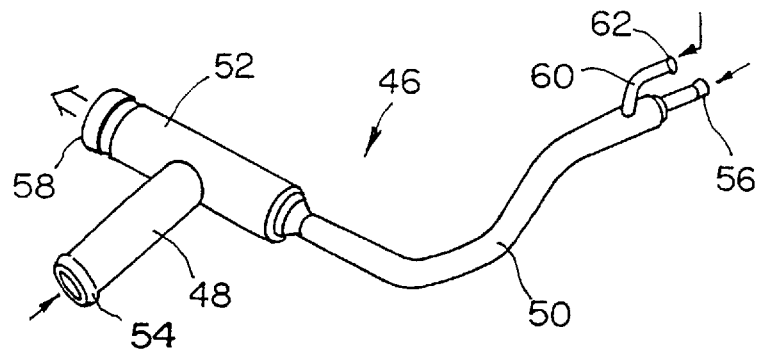
FIG. 3 is a perspective view of the water pipe used in the arrangement of FIGS. 1–2.
Figure 4:
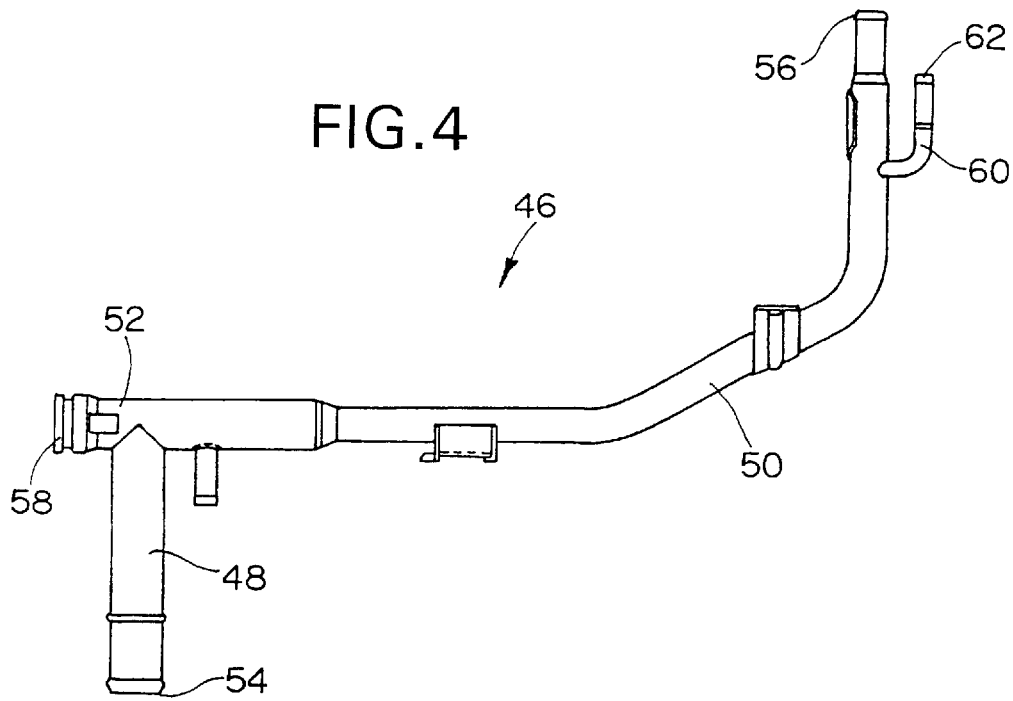
FIG. 4 is a top view of the water pipe of FIG. 3.
Figure 5:
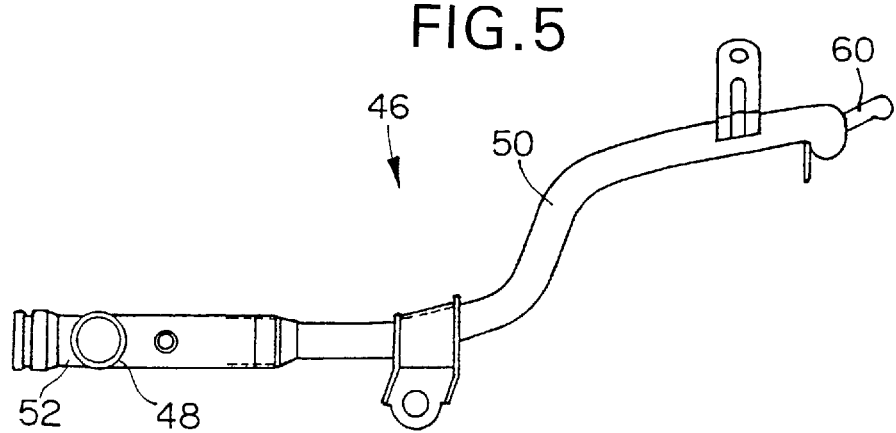
FIG. 5 is a front view of the water pipe of FIG. 3.
Figure 6:
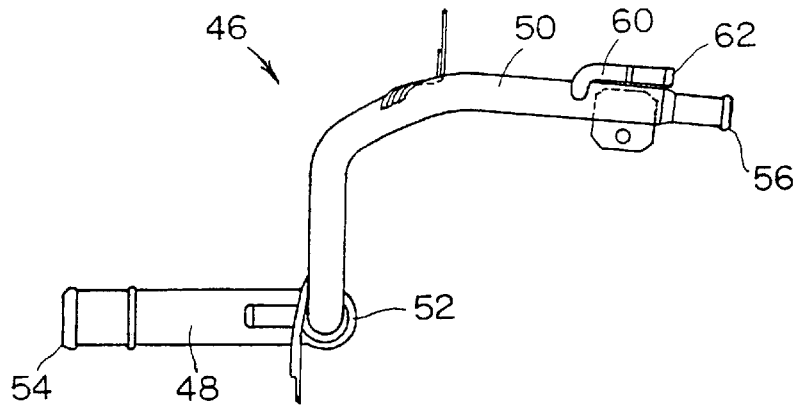
FIG. 6 is a side view of the water pipe of FIG. 3.
Figure 7:
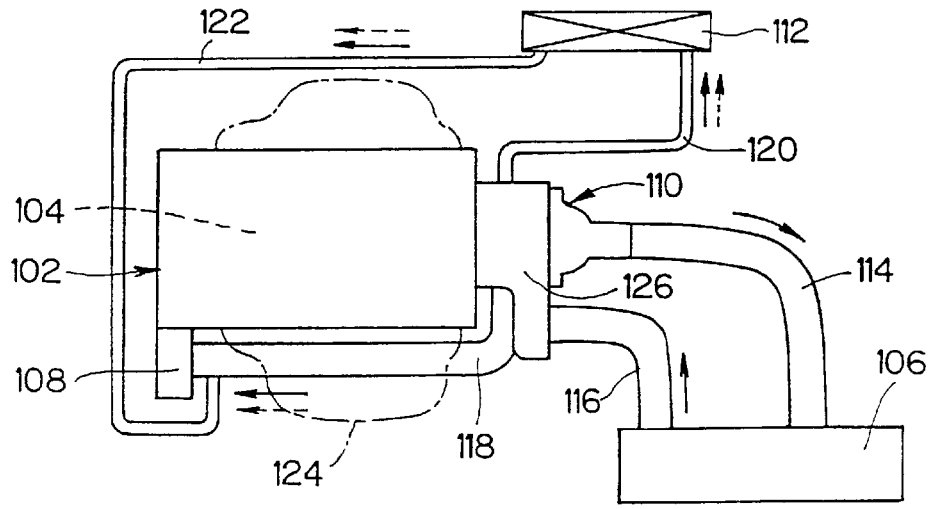
FIG. 7 is a diagrammatic top view of a conventional coolant pipeline arrangement for a vehicle engine.
Figure 8:
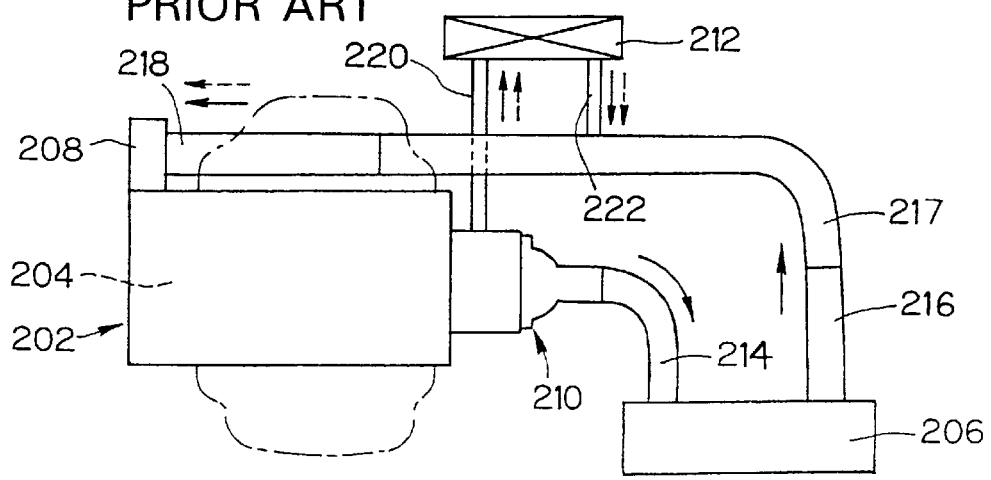
FIG. 8 is a diagrammatic top view of another conventional car coolant pipeline arrangement for a vehicle engine.

FIGS. 1 and 2 are diagrammatic views of an engine coolant pipeline wherein 2 is a vehicle engine, 4 is a cylinder block, 6 is a cylinder head, 8 is a head cover, and 10 is an oil pan. The engine 2 has a water jacket 12 for the cylinder block 4 and the cylinder head 6, and an intake manifold 14, and an exhaust manifold 16 for the cylinder head 6. A throttle body 18 is provided for the intake manifold 14.

The engine 2 has a radiator 20 for cooling the coolant which has passed through the water jacket 12; a water pump 22, which is provided at the inlet of the water jacket and driven from the engine crankshaft (not shown in the drawings), for supplying the water jacket 12 with the coolant at a high pressure; a thermostat 24, which is provided at the outlet of the water jacket, for admitting or stopping the circulation of the coolant to the radiator depending on the temperature of the coolant flowing out of the water jacket 12; and a heater core 26 for warming the passenger compartment of the vehicle (not shown in the drawings).

The thermostat 24 has a thermo-case 28 and a thermo-cap 30, and contains a thermostat valve 32. The thermostat valve 32 stops the circulation of the coolant to the radiator 20 by closing when the temperature of the coolant is equal to or lower than a preset temperature, and admits the circulation of the coolant to the radiator 20 by opening when the temperature of the coolant is higher than the preset temperature.

The coolant pipeline arrangement of the engine 2 includes a radiator inlet hose 34 for leading the coolant, which has passed through the thermostat 24, to the radiator 20; a radiator outlet hose 36 for conducting the coolant, which has passed through the radiator 20, to the water pump 22; a heater inlet hose 38 for conducting the coolant, which has not yet passed through the thermostat 24, from the discharge end of the water jacket 12 to a heater core 26; a heater outlet hose 40 for conducting the coolant, which has passed through the heater core 26, to the water pump 22.

The coolant pipeline arrangement also includes a body inlet hose 42 for conducting the coolant from the outlet of water jacket 12 to the throttle body 18; a body outlet hose 44 for conducting the coolant which has passed through the throttle body 18 to a water pipe 46; and the water pipe 46 conducts the coolant which has passed through the throttle body 18, the radiator 20, and the heater core 26 to the water pump 22.

One end of the radiator inlet hose 34 is connected to the thermo-cap 30 of the thermostat 24, and the other end is connected to the radiator 20. One end of the radiator outlet hose 36 is connected to the radiator 20, and the other end is connected to a part of water pipe 46, as described below.

One end of the heater inlet hose 38 is connected to the thermo-case 28 of the thermostat 24, and the other end is connected to the heater core 26. One end of the heater outlet hose 40 is connected to the heater core 26, and the other end is connected to a part of water pipe 46, as described below.

One end of the body inlet hose 42 is connected to the thermo-case 28 of the thermostat 24, and the other end is connected to the throttle body 18. One end of the body outlet hose 44 is connected to the throttle body 18, and the other end is connected to a part of water pipe 46, as described below.

In FIG. 1, the solid arrows indicate the direction of coolant flow with the thermostat open, and the dashed arrows indicate the direction of coolant flow with the thermostat closed.

As shown in FIGS. 3 through 6, the water pipe 46 has a coolant pipe unit 48 in the radiator flow path and a pipe unit 50 in the heater flow path, to which the radiator outlet hose 36 and the heater outlet hose 40 are connected respectively. Pipe 46 also has a pipe unit 52 adjacent the pump which integrates the pipe units 48 and 50 and is connected to the input of the water pump 22.

The pipe unit 48 has a radiator connection part 54 to which the radiator outlet hose 36 is connected. The pipe unit 50 has a heater connection part 56 to which the heater outlet hose 40 is connected. The pipe unit 52 has a pump connection part 58 to which the water pump 22 is connected. The pipe unit 50 is connected to a pipe unit 60 which has a body connection part 62 to which the body outlet hose 44 is connected.

As shown in FIG. 2, the water pipe 46 has the pipe unit 50 located so as to pass under the exhaust manifold 16.

The pipe 46 as described above thus has two branch pipe sections 48 and 50 which join to the main pipe section 52 which in turn couples to the water pump 22. The branch pipe section 50, adjacent its free end, in turn defines the sub-branches 56 and 60.

Described below is the operation and benefits of the present invention.

In the vehicle engine 2, the coolant is supplied by the water pump 22 when it is driven, and it passes through the thermostat 24 located between the water jacket 12 and the radiator 20. When the temperature of the circulating coolant is equal to or lower than a preset temperature, the thermostat valve 32 closes and stops the circulation of the coolant to the radiator 20. The coolant flows through the water jacket 12 and the thermo-case 28. From the case 28 the coolant flows through parallel paths, one being the hose 42, body 18 and hose 44 back to the pipe section 50, and the other path being the hose 38, heater core 26 and hose 40 back to the pipe section 50. The coolant then flows from pipe section 50 to the pipe unit 52 and is circulated back into the water jacket 12 by the water pump 22.

On the other hand, when the temperature of the coolant exceeds the preset temperature, the thermostat valve 32 is opened, allowing the flow of coolant into the radiator 20. The coolant flows through the water jacket 12, the thermo-case 28, the thermostat valve 32, the thermo-cap 30, the radiator inlet hose 34, the radiator 20, the radiator outlet hose 36, the pipe unit 48, and the pipe unit 52, and is circulated back into the water jacket 12 by the water pump 22.

When the coolant is flowing through the radiator 20, the coolant will also be flowing through the throttle body 18 and the heater core 26 as previously discussed.

If the thermostat 24 stops the circulation of the coolant to the radiator 20, then the coolant is warmed by the water jacket 12 of the engine 2. Also, the coolant circulating from the heater core 26 to the pipe unit 50 can be warmed by the exhaust heat of the exhaust manifold 16. In contrast, if the circulation of the coolant is allowed to flow to the radiator 20 through the thermostat 24, then the majority of the coolant flowing from the radiator 20 does not circulate in the pipe unit 50. Therefore, the effect of the exhaust heat of the exhaust manifold 16 on the coolant temperature is negligible since the pipe unit is remote from the exhaust manifold.

Since the pipe unit 50 passes under the exhaust manifold 16, water pipes 46 of the same shape can be used regardless of the model or type of transmission (not shown in the drawings) that is selectively mounted to the engine 2. Therefore, only a radiator inlet hose 34 is connected to the thermostat 24. The radiator outlet hose 36 or the water pipe 46 is not connected to the thermostat 24 as in the prior art arrangements, and the resulting structure of a thermo-case 28 is not complicated. Consequently, the water pipe 46 can be used regardless of the type of transmission, and the thermo-case 28 can be of simple design.

Therefore, the coolant pipe arrangement of the engine 2 can improve the performance of the heater 26 by warming the coolant using the exhaust heat. When the coolant is circulated to the radiator 20, the cooling capacity can be improved when the engine is heated because there is no influence of the exhaust heat on the coolant. Furthermore, the water pipe 46 can be used regardless of the type of transmission, and the form of the thermo-case 28 can be simply designed, thereby reducing the entire cost.

Additionally, since the body outlet hose 44 for introducing the coolant, which has passed through the throttle body 18, to the water pump 22 is connected to the pipe unit 50 provided under the exhaust manifold 16, the coolant warmed by the engine 2 and the exhaust heat can be circulated in the throttle body 18 to warm the intake air even when the engine 2 is cold and the thermostat valve is closed. The coolant pipeline arrangement can thus quickly heat the intake air. As a result, the engine operation can be improved when the engine is cold, and the engine can be quickly warmed.

Thus, in the coolant pipeline arrangement for a vehicle engine according to the present invention, the coolant pipe return from the heater is provided under thee exhaust manifold. Thus, if the thermostat stops the circulation of coolant to the radiator, then not only can the coolant be warmed by the vehicle engine, but also the coolant circulating through the heater can be warmed by the exhaust heat of the exhaust manifold. On the other hand, if the coolant is circulated to the radiator through the thermostat, then the coolant return flow does not pass through the return pipe from the heater. Therefore, the exhaust heat of the exhaust manifold does not effect the coolant flowing from the radiator.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A coolant pipeline arrangement and a vehicle engine combination, said vehicle engine having an exhaust manifold, said arrangement comprising:

a radiator for cooling a vehicle engine coolant passing therethrough;

a water pump for circulating the coolant at a high pressure;

a thermostat for admitting or stopping circulation of the coolant to said radiator depending on a temperature of the coolant;

a radiator inlet hose for conducting the coolant from said thermostat to said radiator, the radiator inlet hose having a first end connected to said thermostat and a second end connected to said radiator;

a radiator outlet hose for conducting the coolant from said radiator, the radiator outlet hose having a first end connected to said radiator and a second end connected upstream of said water pump;

a heater core for heating a vehicle passenger compartment;

a heater inlet hose for conducting the coolant from the vehicle engine to said heater core, the heater inlet hose having one end connected upstream of said thermostat and the other end connected to said heater core;

a heater outlet hose for conducting the coolant from said heater core, said heater outlet hose having one end connected to said heater core and the other end connected upstream of said water pump; and a coolant pipe unit having a radiator pipe section and a heater pipe section to which said radiator outlet hose and said heater outlet hose are connected respectively, and a pump pipe section for combining said radiator and heater pipe sections for connection to said water pump, and said heater pipe section of the water pipe being positioned adjacent and under the exhaust manifold of the engine.

2. The pipeline arrangement according to claim 1, wherein the vehicle engine includes a throttle body, a body inlet hose for conducting coolant from the engine to said throttle body, and a body outlet hose for conducting the coolant from the throttle body to said water pump, the body outlet hose has a first end connected to said throttle body and a second end connected to said heater pipe section, the body inlet hose has a first end connected to said throttle body and a second end connected upstream of said thermostat.

3. A pipeline arrangement according to claim 2, wherein the vehicle engine includes a thermo-case connected to said radiator inlet hose and to said heater inlet hose and to said body inlet hose, said thermo-case containing said thermostat.

4. A vehicle engine combination comprising:
   a vehicle engine having an exhaust manifold;
   a radiator mounted in a vehicle for cooling vehicle engine coolant;
   a water pump mounted to the engine for circulating the coolant at a high pressure;
   a thermostat mounted to the engine for admitting or stopping circulation of the coolant to said radiator depending on a temperature of the coolant;
   a radiator inlet hose connected between said radiator and said thermostat for conducting the coolant from said thermostat to said radiator;
   a radiator outlet hose for conducting the coolant from said radiator toward said water pump;
   a heater inlet hose connected upstream of said thermostat and to a heater core, said heater inlet hose conducting the coolant to said heater core;
   a heater outlet hose for conducting the coolant from said heater core toward said water pump; and
   a coolant pipe having a radiator pipe section and a heater pipe section to which said radiator outlet hose and said heater outlet hose are connected respectively, and a pump pipe section combining said radiator and heater pipe sections and being connected to said water pump, and said heater pipe section of the coolant pipe being provided under said exhaust manifold of the engine.

5. The combination according to claim 4, wherein a body outlet hose for conducting the coolant, which has passed through a throttle body, to said water pump is connected to said heater pipe section.

6. The combination according to claim 5, wherein a body inlet hose conducts the coolant from a thermo-case to said throttle body such that when the engine is cold the coolant heated by said heater pipe section passing under said exhaust manifold is warmed and connected to said throttle body to warm the intake air.

7. The combination according to claim 6, wherein said thermo-case is connected to said radiator inlet hose and to said heater inlet hose and to said body inlet hose, said thermo-case containing said thermostat.

* * * * *